July 8, 1958 N. L. FRANCIS 2,841,883

APPARATUS FOR DRYING AND COOLING

Filed Nov. 10, 1955 11 Sheets-Sheet 1

July 8, 1958 N. L. FRANCIS 2,841,883

APPARATUS FOR DRYING AND COOLING

Filed Nov. 10, 1955 11 Sheets-Sheet 2

July 8, 1958 N. L. FRANCIS 2,841,883

APPARATUS FOR DRYING AND COOLING

Filed Nov. 10, 1955 11 Sheets-Sheet 3

July 8, 1958 N. L. FRANCIS 2,841,883

APPARATUS FOR DRYING AND COOLING

Filed Nov. 10, 1955 11 Sheets-Sheet 4

July 8, 1958 N. L. FRANCIS 2,841,883

APPARATUS FOR DRYING AND COOLING

Filed Nov. 10, 1955 11 Sheets-Sheet 5

July 8, 1958 N. L. FRANCIS 2,841,883

APPARATUS FOR DRYING AND COOLING

Filed Nov. 10, 1955 11 Sheets-Sheet 6

July 8, 1958 N. L. FRANCIS 2,841,883

APPARATUS FOR DRYING AND COOLING

Filed Nov. 10, 1955 11 Sheets-Sheet 8

July 8, 1958 N. L. FRANCIS 2,841,883

APPARATUS FOR DRYING AND COOLING

Filed Nov. 10, 1955 11 Sheets-Sheet 10

United States Patent Office 2,841,883

Patented July 8, 1958

2,841,883

APPARATUS FOR DRYING AND COOLING

Norman L. Francis, La Grange, Ill., assignor to Link-Belt Company, a corporation of Illinois Application November 10, 1955, Serial No. 546,092

15 Claims. (Cl. 34—136)

This invention relates to new and useful improvements in rotary dryers or coolers and deals more particularly with the structure for supporting the material being treated during its movement through and discharge from the dryer or cooler.

A conventional type of rotary drying or cooling apparatus employs a horizontally arranged cylindrical outer shell and a radially inwardly positioned, circular series of tangential louvres for supporting the bed of material advancing axially through the apparatus. The drying or cooling gas is introduced at one end of the apparatus into the space between the outer shell and the louvres for flow between the louvres and through the bed of material and then out at the opposite end of the apparatus. Dryers and coolers of this general type are exemplified by the structure illustrated in the United States Patent No. 2,581,756, issued to John L. Erisman, on January 8, 1952.

It is the primary object of this invention to provide a dryer or cooler of the above mentioned type which will satisfactorily process materials having widely varying angles of repose.

A further important object of the invention is to provide a dryer or cooler of the type mentioned above which is so constructed as to minimize the loss of dusty material with the exhaust treatment gases.

Still another object of the invention is to provide a dryer or cooler incorporating material supporting louvres which are easily installed or replaced and which will handle a large bed of heavy material.

A still further object of the invention is to provide a dryer or cooler having a circular series of material supporting tangential louvres which will effect a positive lifting and rolling of the material advancing thereover and allow a large volume of treatment gases to flow between the louvres into the material without permitting the spaces between the louvres to be clogged with material.

Another object of the invention is to provide a dryer or cooler of the aforementioned type wherein the depth of the bed of material advancing through the apparatus may be easily and quickly adjusted.

A further object of the invention is to provide a dryer or cooler from which material is discharged without further exposure to the treatment gases so that the temperature of the material leaving the dryer or cooler may be accurately controlled.

Other objects and advantages of the invention will be apparent during the course of the following description.

Figure 1:
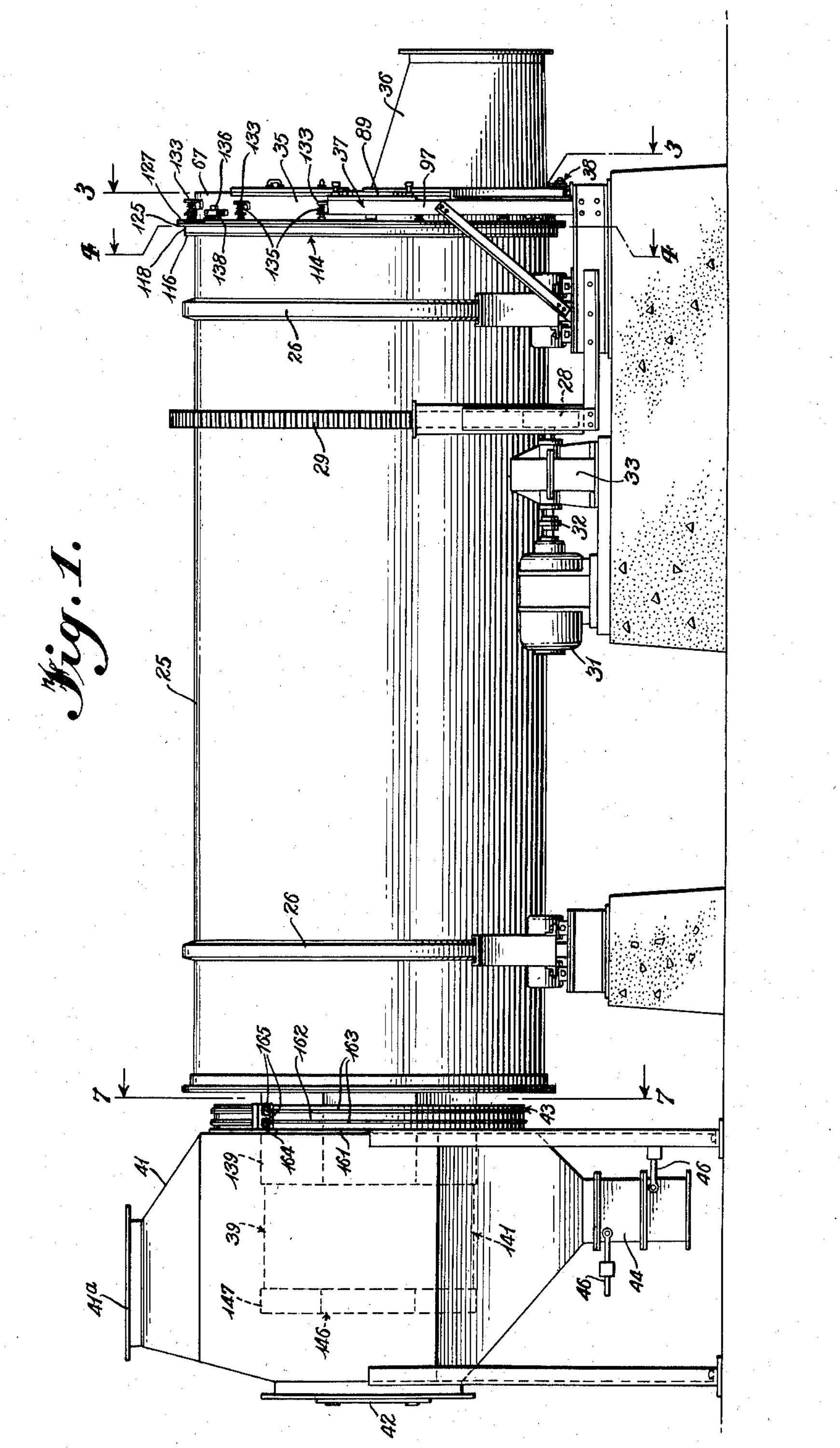
Figure 2:
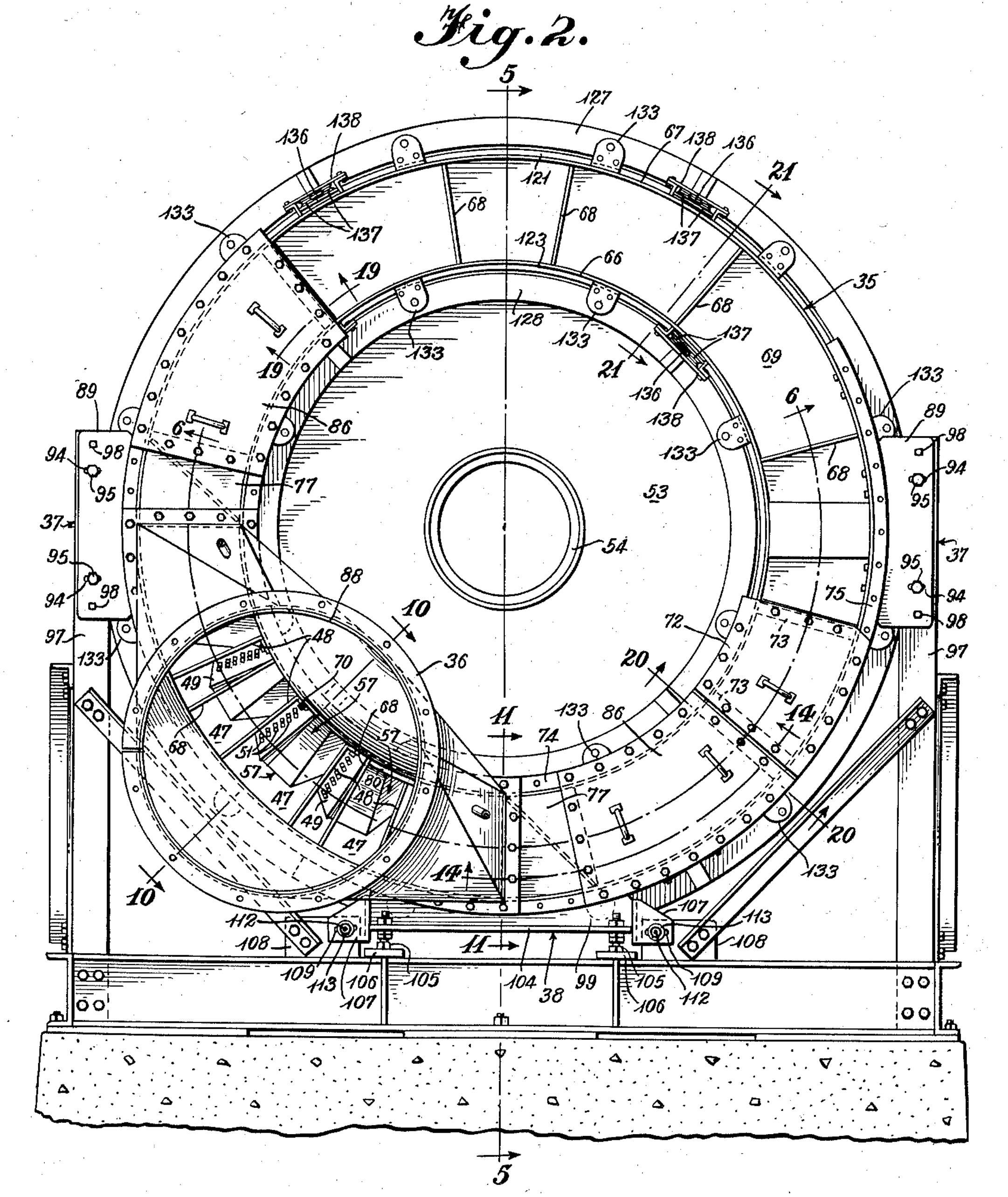
Figure 3:
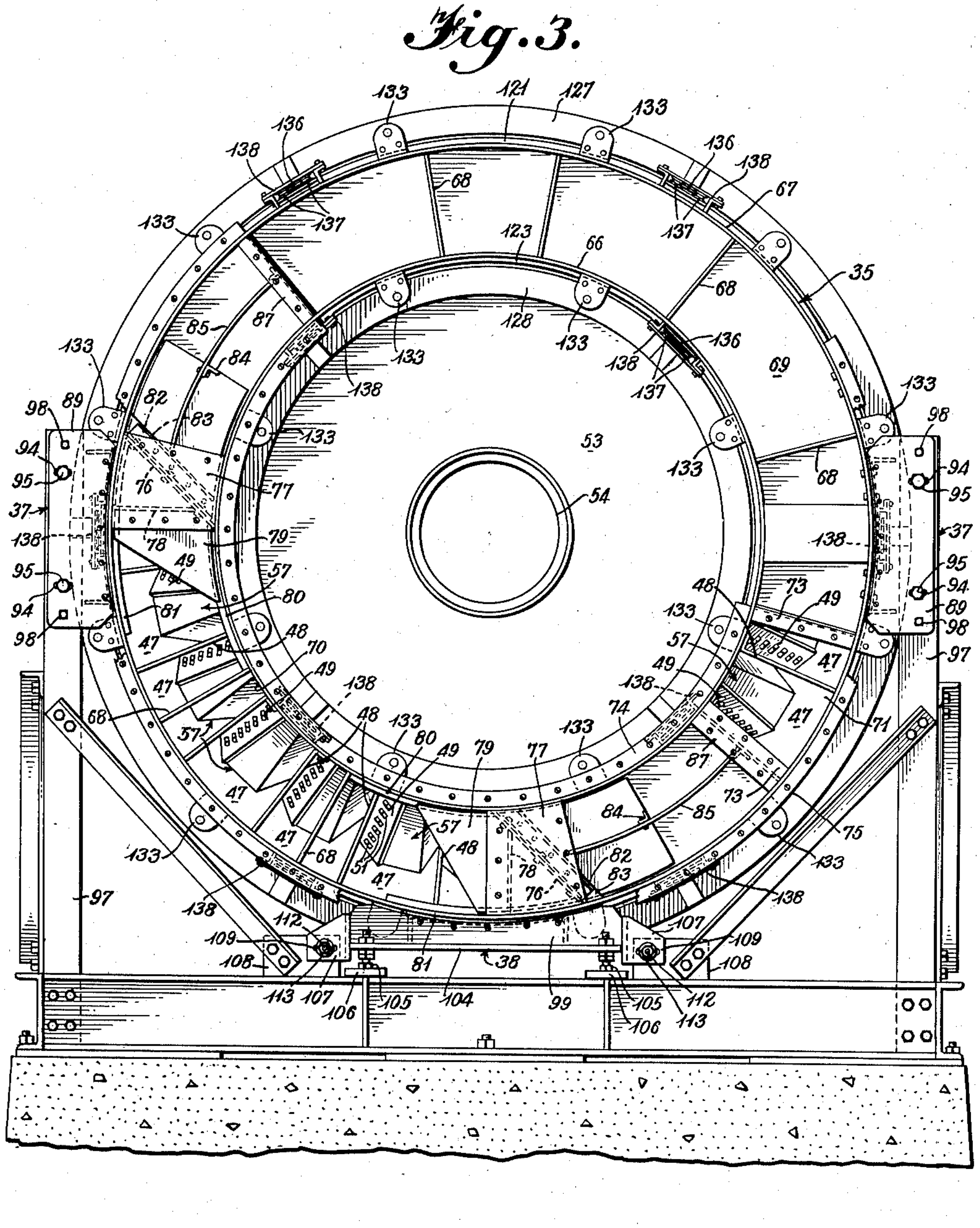
Figure 4:
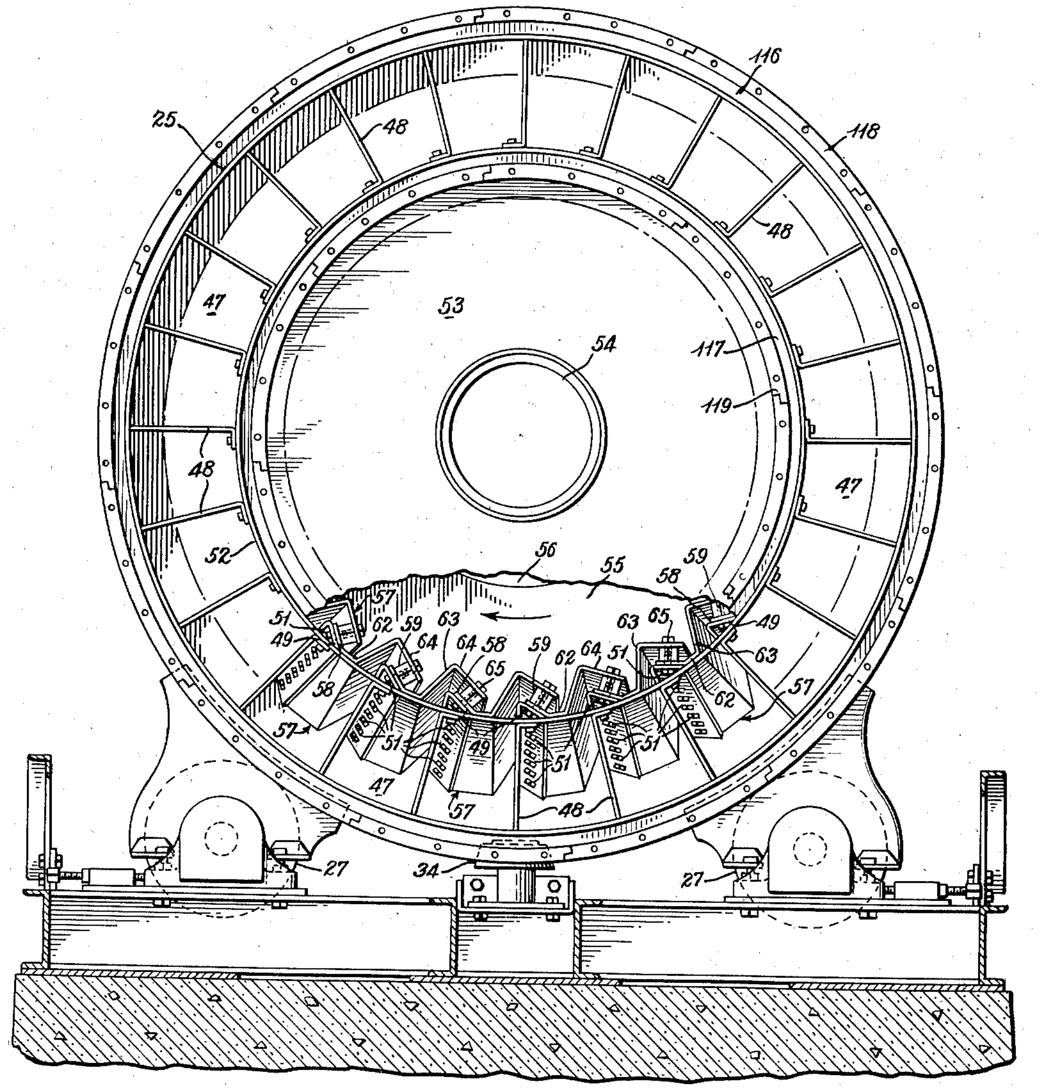
Figures 5A, 9:
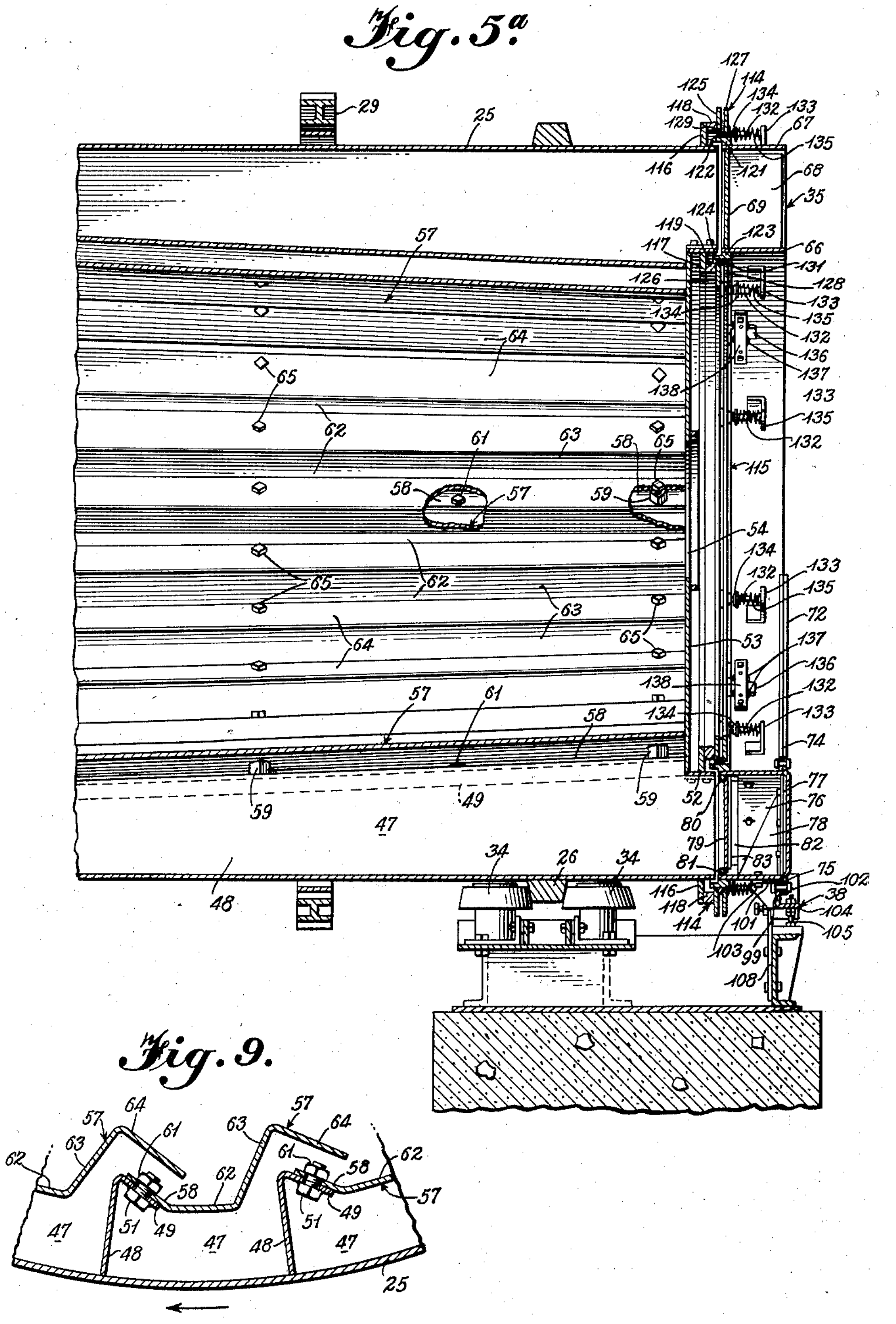
Figures 5B, 8:
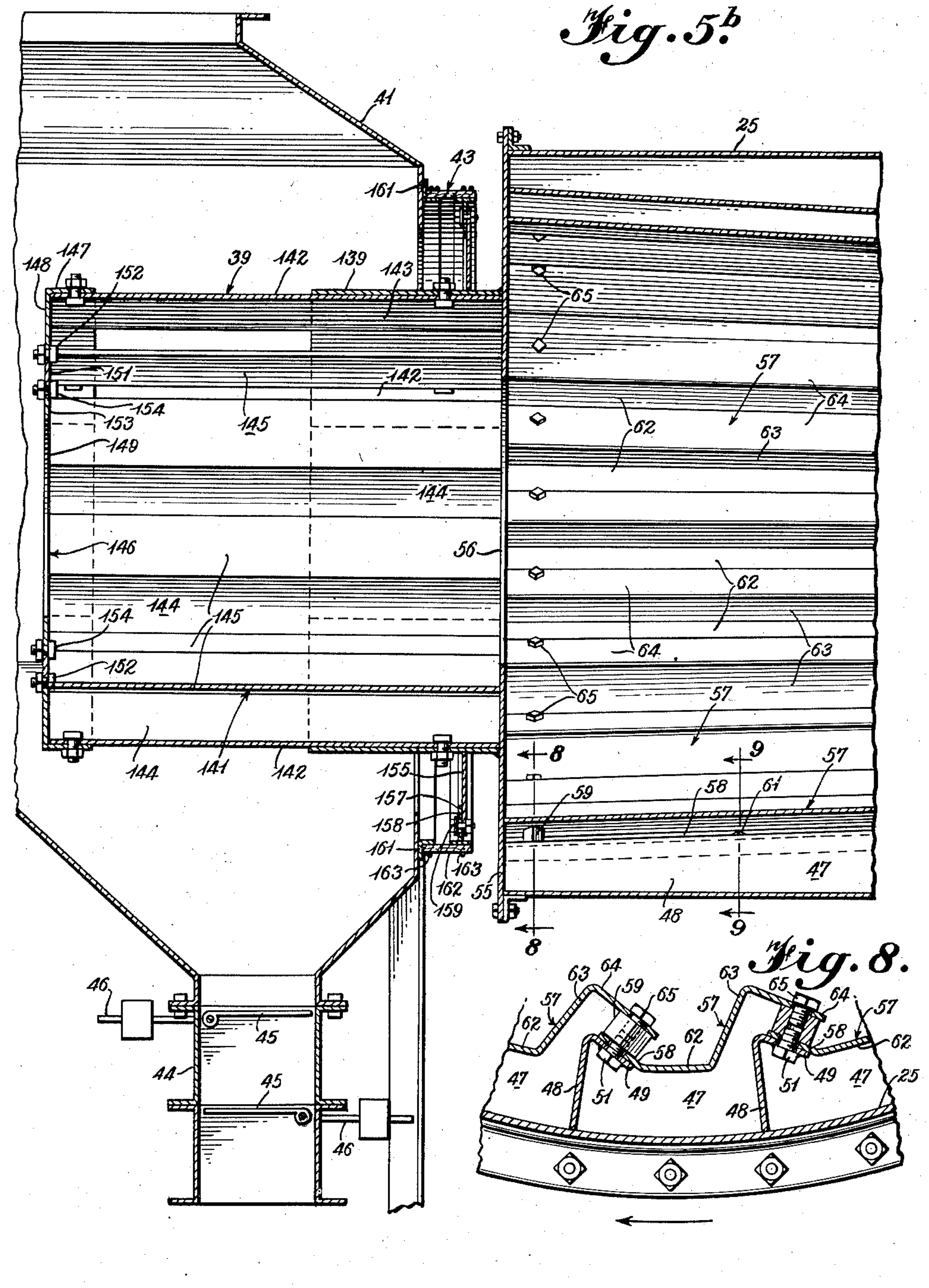
Figure 6:
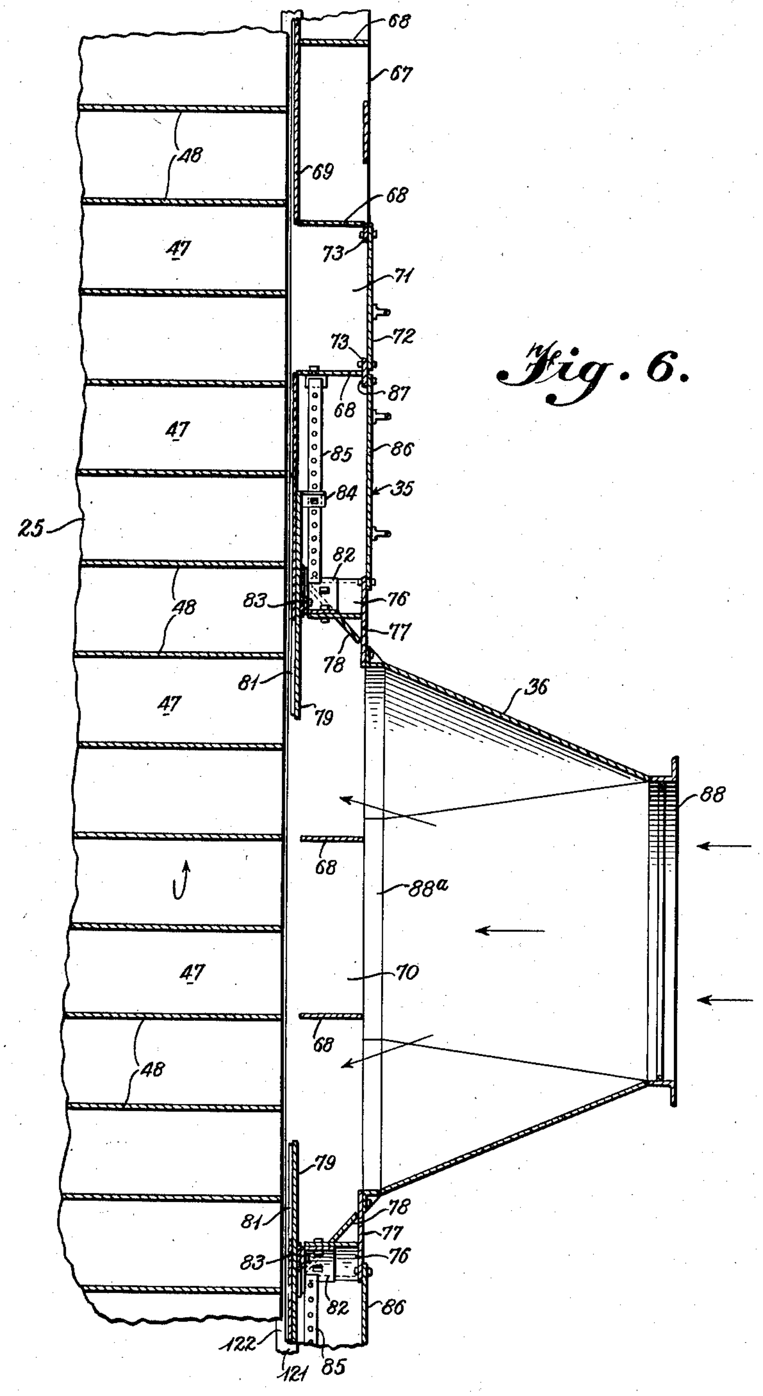
Figure 7:
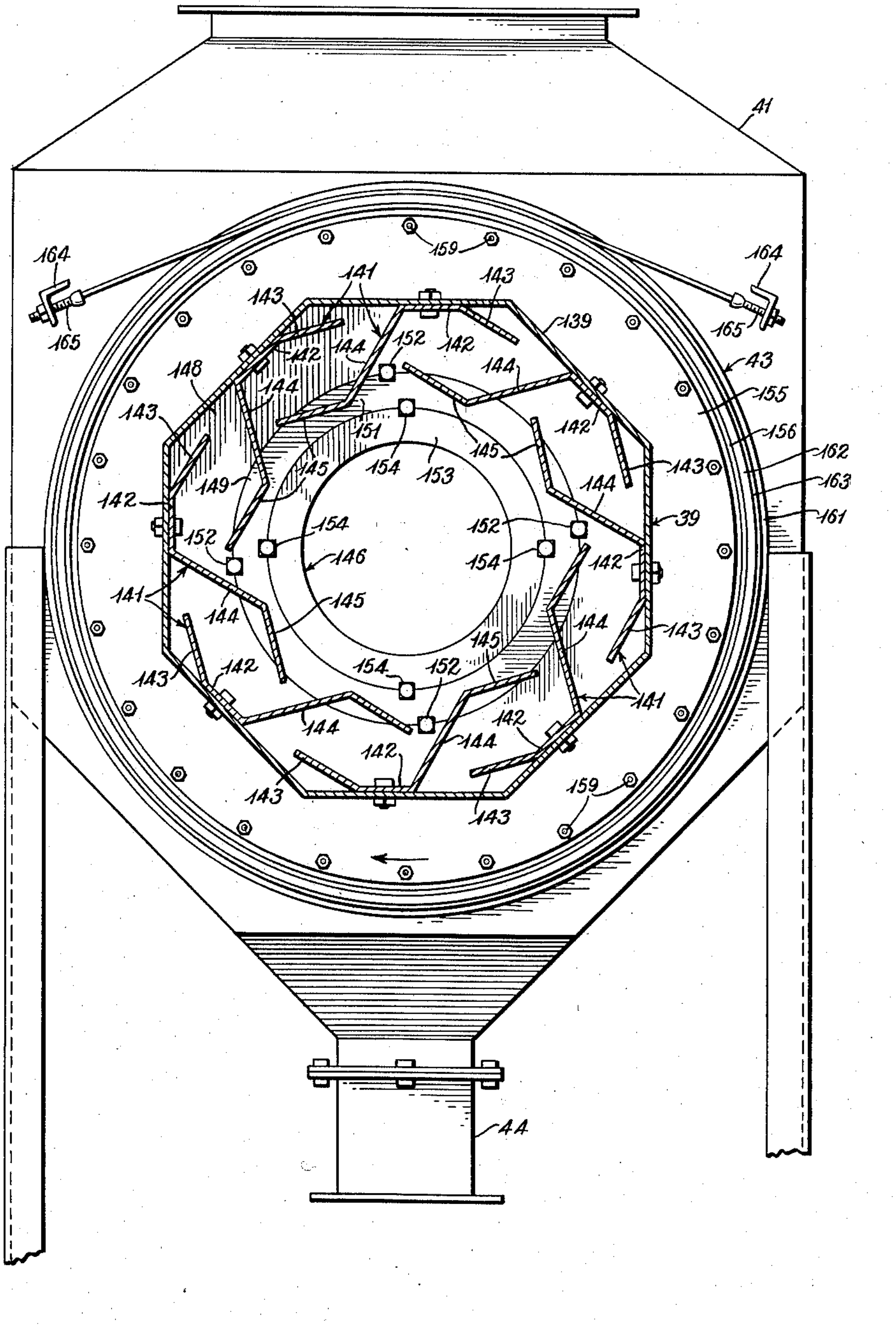
Figures 10, 11, 12, 13:
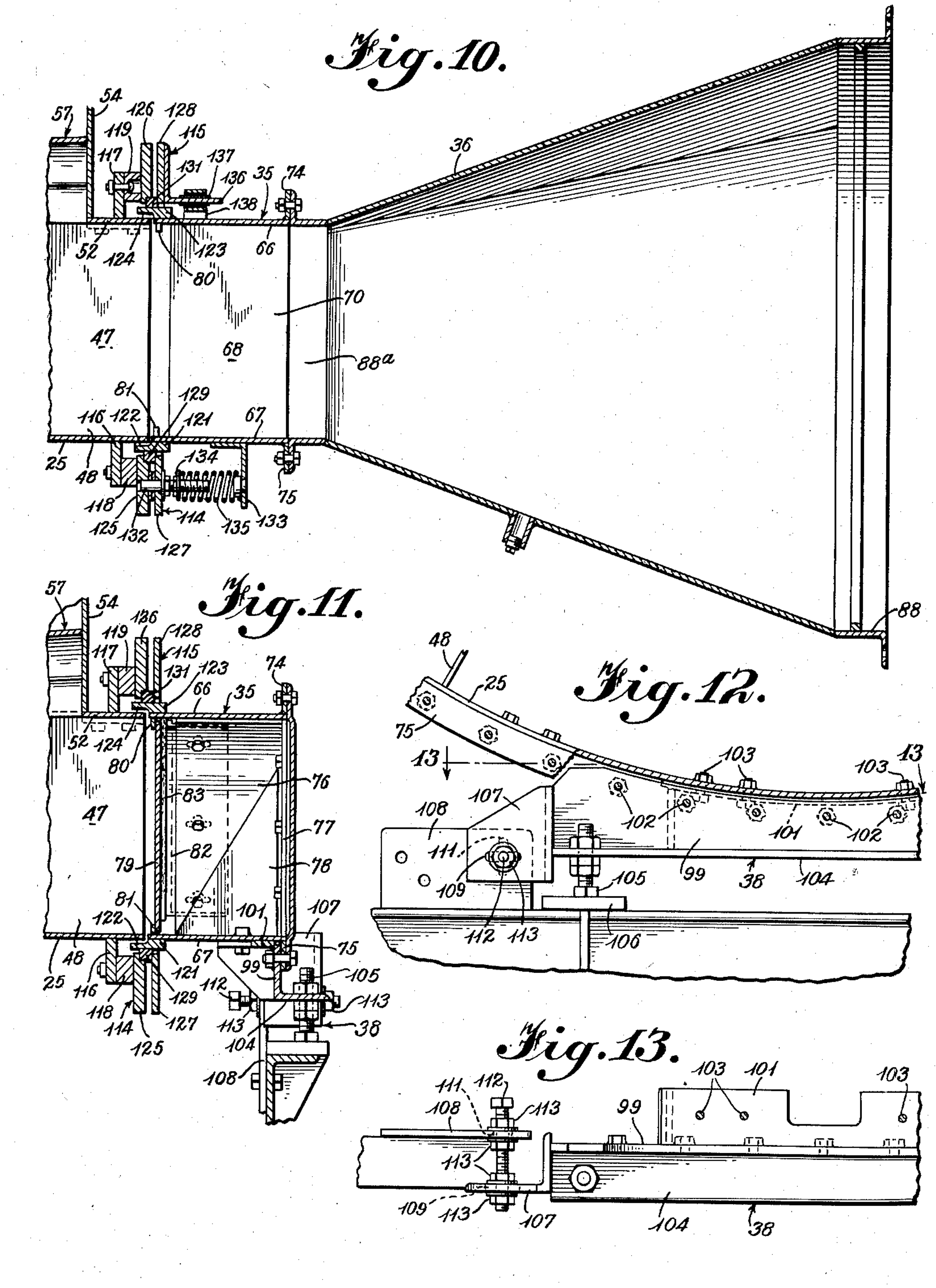
Figures 14, 15, 16, 17:
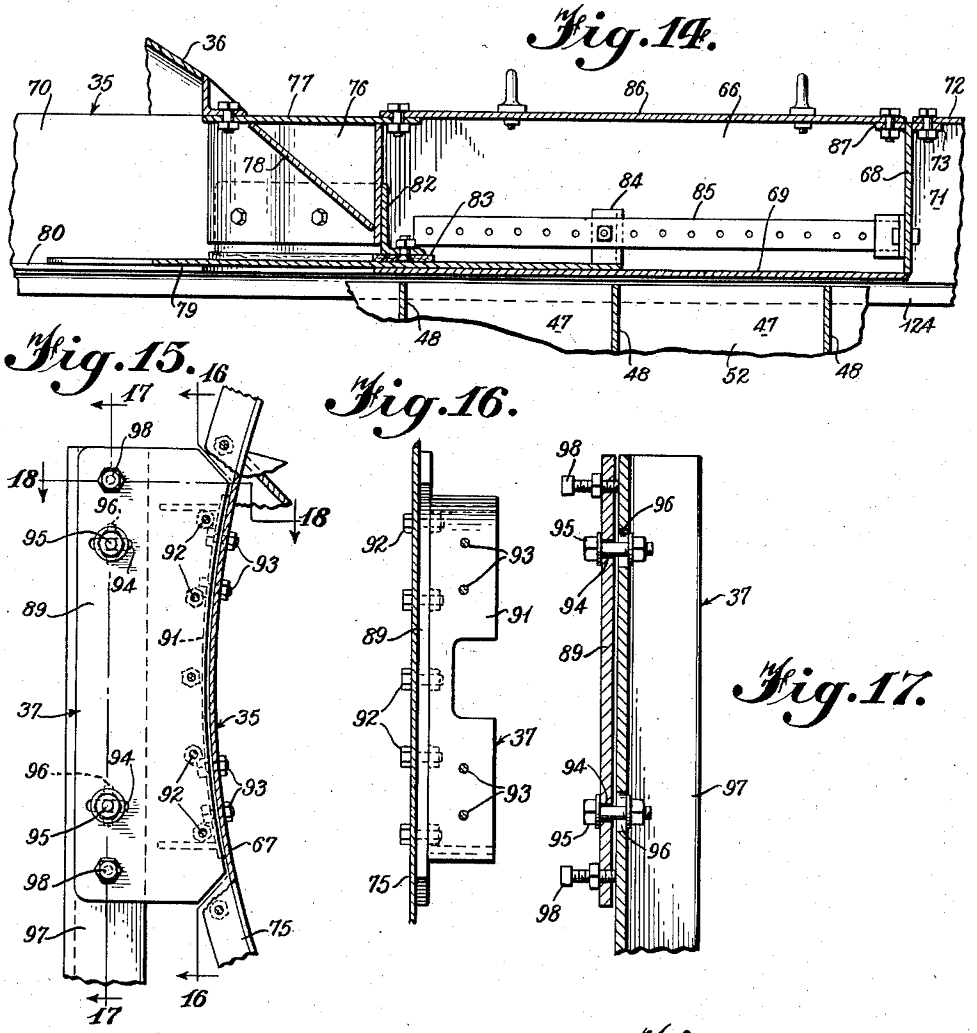
Figure 18:
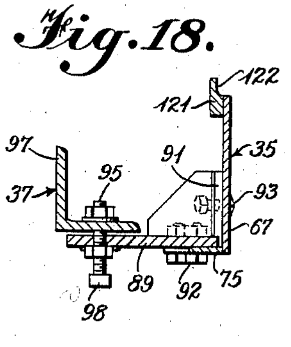
Figure 19:
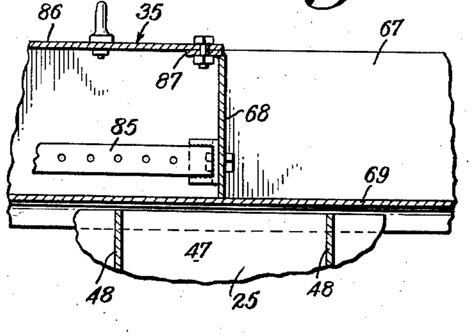
Figure 20:
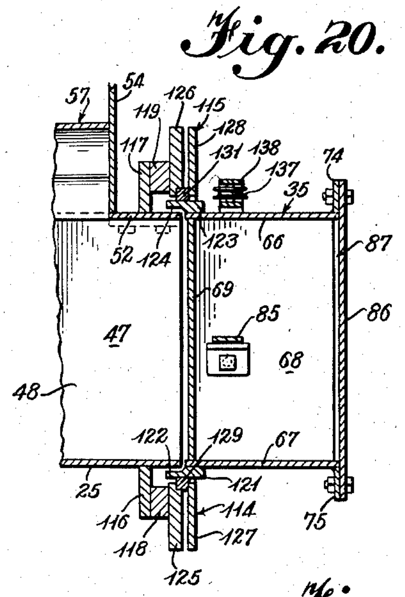
Figure 21:
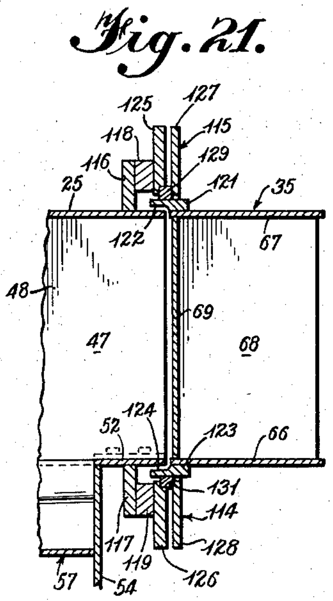
Figure 22:
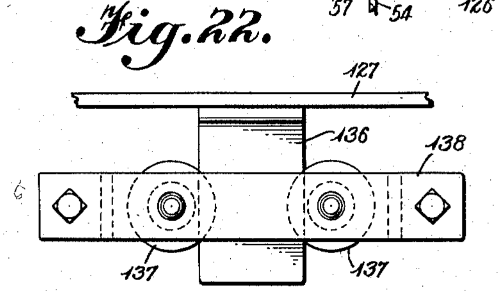
Figure 23:
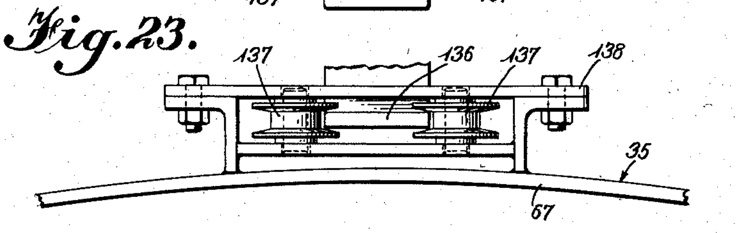
Figure 24:
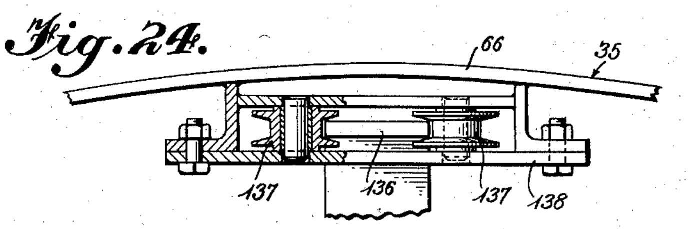

In the accompanying drawings forming a part of this specification and in which like reference characters are employed to designate like parts throughout the same, Figure 1 is a side elevational view of a dryer or cooler embodying the invention, Figure 2 is an elevational view of the feed end of the apparatus illustrated in Fig. 1, Figure 3 is a vertical sectional view taken on line 3—3 of Fig. 1, Figure 4 is a vertical sectional view taken on line 4—4 of Fig. 1, Figures 5*a* and 5*b* collectively illustrate a longitudinal sectional view taken on line 5—5 of Fig. 2, Figure 6 is a single plane projection of a fragmentary section taken on line 6—6 of Fig. 2, Figure 7 is a vertical sectional view taken on line 7—7 of Fig. 1, Figure 8 is a fragmentary sectional view taken on line 8—8 of Fig. 5*b*, Figure 9 is a fragmentary sectional view taken on line 9—9 of Fig. 5*b*, Figure 10 is a fragmentary sectional view taken on line 10—10 of Fig. 2, Figure 11 is a fragmentary sectional view taken on line 11—11 of Fig. 2, Figure 12 is a fragmentary elevational view of the bottom support for the treatment gas distributing ring at the feed end of the device illustrated in Fig. 1, Figure 13 is a transverse sectional view taken on line 13—13 of Fig. 12, Figure 14 is a single plane projection of a fragmentary section taken on line 14—14 of Fig. 2, Figure 15 is a fragmentary elevational view of one of the side supports for the gas distributing ring of the device illustrated in Fig. 1, Figure 16 is a vertical sectional view taken on line 16—16 of Fig. 15, Figure 17 is a vertical sectional view taken on line 17—17 of Fig. 15, Figure 18 is a horizontal sectional view taken on line 18—18 of Fig. 15, Figure 19 is a fragmentary sectional view taken on line 19—19 of Fig. 2, Figure 20 is a fragmentary sectional view taken on line 20—20 of Fig. 2, Figure 21 is a fragmentary sectional view taken on line 21—21 of Fig. 2, Figure 22 is a fragmentary plan view of one of the outer guide assemblies for the seal ring carried by the distributing ring, Figure 23 is an end elevational view of the guide assembly illustrated in Fig. 22, and Figure 24 is a fragmentary end elevational view, partly in cross section, of one of the inner guide assemblies for the seal ring.

In the drawings, wherein for the purpose of illustration is shown the preferred embodiment of this invention, and first particularly referring to Fig. 1, reference character 25 designates a horizontally arranged cylindrical shell of a dryer or cooler that is supported for rotation by conventional tires 26 and trunnions 27 and is rotated by a pinion 28 and ring gear 29 driven by a motor 31 through a flexible coupling 32 and a gear reduction unit 33. As illustrated in Figs. 4 and 5*a*, the tire 26 at the feed end portion of the shell 25 is engaged at its opposite side surfaces by thrust rollers 34 which prevent longitudinal movement of the shell 25 on its supporting trunnions 27.

At the feed end of the shell 25 there is provided an annular distributing ring assembly 35 through which a treatment gas, generally air, is introduced into the shell as will be later described. The distributing ring assembly is provided with an inlet air connector 36 for communication with a suitable source of supply of treatment gas, not shown, and the entire assembly is carried at its opposite sides by distributing ring supports 37 and at its bottom by a distributing ring support 38.

At the opposite end of the shell 25 there is provided a discharge nozzle, designated in its entirety by the reference character 39, and a discharge hood 41 is mounted to encase the discharge nozzle which projects through an opening in one side of the hood. At the outer side of the discharge hood there is provided an access opening which is normally closed by a door or cover 42.

A seal assembly 43 prevents the escape of treatment gases from the opening through which the discharge nozzle 39 projects. At the top of the discharge hood 41 there is provided an outlet connection 41a for the removal of treatment gases and a discharge spout 44 is provided at the bottom of the discharge hood for releasing treated material therefrom. Positioned in the spout 44 are a pair of dampers 45, as illustrated in Fig. 5b, which are each urged into closing relationship with the spout by a counterweighted lever arm 46. The dampers 45, therefore, will be maintained in their closed positions except when a sufficient quantity of material has accumulated in the bottom of the discharge hod to overcome the closing effect of the counterweighted lever arms 46.

Referring now to Figs. 4, 5a and 5b it will be noted that the shell 25 has formed therein an annular series of axially extending treatment gas passages 47 adjacent its inner circumference which open radially inwardly and are separated by partitions, such as axially extending, radial louvres 48 that are secured along their outer longitudinal edges to the shell 25 in any suitable manner. As illustrated in Figs. 5a and 5b the radial louvres 48 are longitudinally tapered to gradually decrease the radial dimension of each passage 47 from the feed end to the discharge end of the shell 25. The inner longitudinal edge portion of each radial louvre 48 is bent radially outwardly and rearwardly relative of the direction of rotation of the cylinder 25 to provide a mounting flange 49. At longitudinally spaced points along each mounting flange 49, cap screws 51 project through and are welded to the flange.

At the feed end of the shell 25, see Figs. 4 and 5a, the inner edge portions of the radial louvres 48 are notched to receive the annular ring 52 which extends circumferentially around and is suitably connected to the louvres. The outer end edge of the ring 52 is in radial alignment with the corresponding end edge of the shell 25 and the two aligned edges along with the end edges of the radial louvres 48 collectively define the inlet openings for the treatment gas passages 47. A feed end plate 53, having a centrally located opening 54, is positioned within and has its peripheral edge suitably connected to the inner edge portion of the ring 52.

At the discharge end of the shell 25, a radial discharge end plate 55 is mounted and is provided with a centrally located discharge opening 56, as illustrated in Fig. 5b.

Referring now to Figs. 4, 5a, 5b, 8 and 9 it will be noted that each radial louvre 48 has mounted on its flange 49 a tangential louver 57 which extends longitudinally along the radial louvre 48, and axially of the shell 25, in one direction and, in another direction, extends rearwardly, with respect to the direction of rotation of the shell, from the radial louvre 48 in a direction generally tangential to the circle generated by the radially inner edge portion of said radial louvre. The opposite ends defining the longitudinal extremities of each tangential louvre 57 are arranged in abutting relationship with the feed end plate 53 and the discharge end plate 56, respectively. The leading edge portion 58 of each tangential louvre 57, relative to the direction of rotation of the shell 25, is provided with a series of longitudinally spaced holes for receiving the cap screws 51 of the associated mounting flange 49. This edge portion, see Figs. 8 and 9, is secured to the mounting flange by spacer nuts 59 which are threaded onto the cap screws 51 adjacent the opposite ends of the mounting flange and on alternate cap screws therebetween and by conventional nuts 61 which are threaded onto the remaining cap screws. The spacer nuts 59 are substantially thicker than the conventional nuts 61 for a purpose that will be later described.

Adjacent its leading edge portion 58, each tangential louvre 57 is bent to form a longitudinally tapered intermediate portion 62 the width of which increases toward the discharge end of the shell 25, as illustrated in Fig. 4, to compensate for the increased spacing between the inner edges of the radial louvres 48 as they diverge from the axis of the shell. In other words, the intermediate portion 62 of each tangential louvre 57 extends rearwardly from the leading edge portion 58 to with a uniform distance or spacing from the rearwardly adjacent radial louvre 48, as illustrated in Figs. 8 and 9. The portion of each tangential louvre 57 adjacent the intermediate portion 62 is bent to form a second intermediate portion 63 which extends rearwardly and radially inwardly into spaced radial alignment with the rearwardly adjacent radial louvre 48 where the louvre 57 is again bent to form a trailing edge portion 64. The trailing edge portion 64 of each tangential louvre 57 extends rearwardly and radially outwardly in spaced parallel relationship with the leading edge portion 58 of the next rearwardly adjacent tangential louvre, the spacing between the overlapped edge portions of the tangential louvres being equal to the thickness of the spacer nuts 59. Each trailing edge portion 64 is provided with longitudinally spaced holes in alignment with the threaded bores of the spacer nuts 59 for receiving cap screws 65 by means of which such edge portion is secured to the associated spacer nuts.

In this manner, the overlapped leading and trailing edge portions 58 and 64, respectively, of the adjacent tangential louvres 57 are held in fixed spaced relationship to provide an outlet opening for each treatment gas passage 47. Further, the tangential louvres 57 extend across the spaces between and are rigidly supported on the inner edge portions of the radial louvres 48 and the angular relationship between the various portions of the tangential louvres will greatly increase their strength. It will be noted, by reference to Figs. 8 and 9, that the outlet provided by each pair of overlapped edge portions 58 and 64 is directed rearwardly and radially outwardly relative to the direction of rotation of the shell 25.

Referring now to Figs. 2, 3 and 5a for a detail description of the distributing ring assembly 35, it will be noted that the inner and outer rims of the assembly are provided by concentrically arranged radially spaced inner and outer rings 66 and 67, respectively. The rings 66 and 67 are axially aligned with the ring 52 and shell 25 at the inlet end of the shell, with a slight space therebetween, and are maintained in concentric relationship with each other by radially arranged webs 68.

Mounted on the longitudinally inner side of the distributing ring assembly 35, to close the space between the inner and outer rings 66 and 67 through an arc of approximately two-hundred and seventy degrees is an arcuately formed back plate 69. The ends of this plate intersect the inner ring 66 at points that are spaced ninety degrees from each other so that the air inlet opening 70, formed by the rings 66 and 67 and the ends of the plate 69, extends through an arc of ninety degrees at the inner ring 66 and a greater arc at the outer ring 67. The position of the air inlet opening 70 may be varied, as will be later described, but it will be noted at this time that the opening is displaced from the bottom of the shell 25 in the direction of rotation of the latter. Spaced circumferentially rearwardly from the air inlet opening 70, relative to the direction of rotation of the shell 25, a clean out opening 71 is provided between two of the webs 68, as illustrated in Fig. 3. This opening 71 is normally closed by a cover 72, as illustrated in Fig. 2, which is bolted, or otherwise detachably connected, to flanges 73 at the edges of the adjacent webs 68 and to flanges 74 and 75 which extend circumferentially around the inner ring 66 and outer ring 67, respectively.

As is best illustrated in Figs. 3, 11 and 14, a partition 76 extends obliquely between the inner and outer rings 66 and 67 in axial alignment with each end edge of the plate 69. The inner edge of each partition 76 is spaced from the adjacent edge portion of the plate 69 and the outer edge of each partition terminates at and is connected to a plate 77 that is mounted between the rings 66 and 67 in the plane of the flanges 74 and 75. Mounted in the triangular pocket formed between each partition 76 and the outer ring 67 is a baffle plate 78 which extends angularly inwardly from the plate 77, see Figs. 11 and 14.

A pair of curved damper plates 79 are fitted between the rings 66 and 67 in sliding surface engagement with opposite end portions of the plate 69 as is best illustrated in Figs. 6, 11 and 14. Guide flanges 81 and 82 extend circumferentially along the rings 66 and 67, respectively, from the ends of the plate 69 into the air inlet opening 70. Each damper plate 79, therefore, is movable along its associated end portion of the plate 69 and guide flanges 81 and 82 to cover the adjacent end of the air inlet opening 70. The end edges of the damper plates 79, movable into the inlet opening 70, are obliquely formed to provide a greater arcuate spacing therebetween adjacent the outer ring 67 than adjacent the inner ring 64. A seal is provided between each damper plate 79 and the associated partition 76 by an angle member 82 which is adjustably mounted on the inner edge portion of the partition and which carries a seal member 83 for engaging the outer surface of the damper plate, as illustrated in Fig. 14.

Adjustment of each damper plate 79 circumferentially into and out of the air inlet opening 70 is provided by an outwardly extending lug 84 which is carried by the damper plate for movement through a curved path adjacent the arcuate strap 85 that is mounted on one of the webs 68, as illustrated in Figs. 19 and 20. By reference to Fig. 14, it will be seen that the lug 84 is provided with an opening which may be aligned with a selected one of the longitudinally spaced series of openings in the strap 85 so that a bolt, or the like, may be inserted through the aligned openings to retain the damper plate in its selected position. By proper adjustment of the two damper plates 79, therefore, both the size and position of the opening through the distributor ring assembly 35 may be adjusted within the limits of the air inlet opening 70. A damper cover 86 is detachably connected to the flanges 74 and 75, plate 77 and a flange 87 on the adjacent web 68 to enclose each of the damper adjusting mechanisms.

The air inlet connector 36 has a flanged, circular admission opening 88 and a discharge opening 88*a* that is arcuately formed and is flanged outwardly around its periphery for connection to the edge portions of the plates 77 adjacent the air inlet opening 70 and to the flanges 74 and 75 of the inner and outer rings 66 and 67 respectively. Air, or other treatment gas, delivered to the connector 36 will flow through the opening defined by the rings 66 and 67 and the damper plates 79 into the ends of the axially extending treatment gas passages 47 within the shell 25, as is best illustrated in Fig. 6.

Referring now to Figs. 2, 3 and 15 to 18, inclusive, for a detail description of the supports 37 at opposite sides of the distributing ring 35, it will be seen that each support includes a bracket plate 89 having a curved inner edge portion fitted against the ring 67 adjacent the flange 75. On the side of the plate 89 opposite the flange 75 there is provided a curved flange 91 for engaging the outer surface of the ring 67. The inner edge portion of the bracket plate 89 and the flange 75 are provided with aligned openings for receiving bolts 92 and the flange 91 and ring 67 are provided with aligned openings for receiving the bolts 93 by means of which the bracket plates 89 are secured to diametrically opposed points on the distributing ring assembly 35. It will be noted, however, that additional openings are provided in both the flange 75 and ring 67 so that the bracket plates 89 may be shifted circumferentially of the distributing ring assembly 35 to position the air inlet opening 70 in varying relationship with the bottom of the shell 25. The outer edge portion of each bracket plate 89 has formed therein a pair of vertically spaced, horizontally arranged slots 94 for receiving bolts 95 which extend through vertically arranged slots 96 in the vertical posts 97 mounted at each side of the distributing ring assembly 35.

The position of the distributing ring assembly 35, therefore, may be adjusted vertically by movement of the bolts 95 in the slots 96 or horizontally by movement of the bolts 95 in the slots 94. Set screws 98 are carried by the outer edge portions of the bracket plates 89 in vertically spaced relationship for adjustment to effect axial movement or tilting of the distributing ring assembly and for clamping the latter in a desired position at which the inner ring 66 and outer ring 67 are axially aligned with and are spaced closely adjacent to the ring 52 and the end of the shell 25 at the feed end of the latter.

As is best illustrated in Figs. 2, 3 and 11 to 13, inclusive, the bottom support 38 includes a bracket plate 99 the inner edge of which is curved and provided with a rearwardly extending flange 101. The bracket plate 99 and its flange 101 are connected to the flange 75 and ring 67, respectively, by bolts 102 and 103 at a selected position at the bottom of the distributing ring assembly 35 midway between the side support assemblies 37. The position of the bracket plate 99 will, of course, be selected in accordance with the positions of the diametrically opposed side supports 37. A flange 104 extends outwardly from the bottom edge of the bracket plate 99 and has mounted thereon a pair of laterally spaced set screws 105 which rest upon and are supported by suitably mounted pedestals 106. The set screws 105 may be jointly or individually adjusted to effect vertical movement or lateral tilting of the entire distributing ring assembly 35 before the set screws 98 of the side support assemblies 37 are tightened.

At opposite ends of the bracket plate 99 there are provided brackets 107 each of which is spaced longitudinally from an associated plate 108. Opposed portions of each bracket 107 and associated plate 108 are provided with a horizontally arranged slot 109 and a vertically arranged slot 111, respectively, for receiving the set screw 112 having lock nuts 113 threaded thereon and arranged on opposite sides of both the bracket and the plate. The lock nuts 113, therefore, may be tightened to clamp the bottom support 38 in its desired position as was previously described.

As illustrated in Fig. 5*a*, the space between the ring 67 of the distributing ring assembly 35 and the end edge of the shell 25 is sealed by an outer seal assembly 114 and the space between the inner ring 66 and the ring 52 is sealed by an inner seal assembly 115.

Referring now to Figs. 10 and 20 to 24, inclusive, for a detail description of both of the seal assemblies 114 and 115, it will be seen that radially outwardly and inwardly extending flanges 116 and 117 are mounted on and extend circumferentially around the shell 25 and ring 52, respectively. Mounted on the longitudinally outer side of the flange 116 in radially outwardly spaced relationship with the shell 25 is a wear ring 118 and a similar wear ring 119 is mounted on the flange 117.

An annular seal support 121 is mounted on the longitudinally inner edge of the ring 67 and has a lip 122 arranged in spaced, overlapped relationship with the adjacent edge of the shell 25. The inner ring 66 is also provided with a circumferentially extending seal support 123 having a lip 124 projecting into spaced, longitudinally overlapped relationship with the adjacent edge of the ring 52. Extending circumferentially around the seal support 121 in spaced relationship therewith is an outer wear ring 125 which slidably engages the wear ring 118. An inner wear ring 126 is spaced radially inwardly from the seal support 123 and slidably engages the wear ring 119 of the inner seal assembly 115. Outer and inner clamping rings 127 and 128 are positioned in axial alignment with the rings 125 and 126, respectively, and packing rings 129 and 131 are positioned between the edges of the aligned rings adjacent their associated seal supports 121 and 123 for engagement with the supports.

The outer and the inner clamping rings 127 and 128 are maintained in axial alignment with their associated wear rings 125 and 126 by pins 132 which are carried by the clamping rings and extend through aligned openings in the associated wear rings as illustrated in Fig. 10. The pins 132 are spaced circumferentially around the clamping rings 127 and 128 and in correspondingly spaced positions on the outer ring 67 and inner ring 66 of the distributing ring assembly 35 there are provided longitudinally spaced spring mounting brackets 133. Compressed between each spring mounting bracket 133 and a spring seat 134 carried by the aligned pin 132 is a spring 135 which urges the associated clamping ring 127 or 128 in an axial direction to maintain the packing members 129 and 131 in clamped engagement with their associated seal supports 121 and 123 and to maintain the outer wear ring 125 and inner wear ring 126 in sliding engagement with their associated wear rings 118 and 119.

The clamping rings 127 and 128 are supported for axial movement in concentric relationship with the distributing ring assembly 35 by guide brackets 136 which are mounted at circumferentially spaced points on the two clamping rings and project axially outwardly therefrom. As illustrated in Figs. 22 to 24, inclusive, the guide brackets 136 each have their opposite side edges engaged by flanged rollers 137 carried by brackets 138 which are mounted on the rings 66 and 67.

Referring now to Figs. 5*b* and 7 for a detail description of the discharge nozzle 39, it will be noted that a mounting flange 139 is welded, or otherwise suitably connected, to the end plate 55 and extends axially outwardly therefrom. The mounting flange 139 is arranged radially outwardly of the opening 56 in the end plate 55 and is of octagonal shape in cross section. Symmetrically mounted on each one of the eight sides of the flange 139 is an axially extending discharge louvre 141 the inner end of which is arranged in abutting relationship with the end plate 55 between the flange and the opening 56 in the end plate. Each of the discharge louvres 141 is formed with a flat mounting portion 142 arranged in face contact with and secured to the associated side of the flange 139. It will be readily apparent that rotation of the shell 25, therefore, will effect rotation of the flange 139 and louvres 141.

Adjacent the mounting portion 142 of each discharge louvre 141 and on the leading side thereof, relative to the direction of rotation of the shell 125, there is formed a leading edge portion 143 which projects forwardly and radially inwardly from the mounting portion 142. Projecting rearwardly and radially inwardly from the opposite side of the mounting portion 142 of each discharge louvre 141 is an intermediate portion 144 which extends into circumferentially overlapped relationship with the leading edge portion 143 of the next adjacent discharge louvre. The trailing edge portion 145 of each discharge louvre 141 extends rearwardly and radially outwardly from the intermediate portion 144 in parallel relationship with the overlapped leading edge portion 143 and into spaced relationship with the intermediate portion 144 of the next adjacent discharge louvre.

By reference to Fig. 7 it will be seen that the overlapped portions of the discharge louvres 141 are so formed and spaced as to provide a tortuous passageway therebetween which will permit the escape of treatment gas from the central space defined by the discharge louvres but which will prevent the loss of material through the spaces between the louvres during passage of the material axially of the discharge nozzle 39.

At the outer ends of the discharge louvres 141 there is provided a cap 146 which abuts the ends of the louvres and is provided with an inwardly extending peripheral flange 147 having the same shape and dimensions as those of the mounting flange 139. The flange 147 is bolted to the mounting portion 142 of each of the discharge louvres 141 and it will be noted that the flanges 147 and 139 are axially spaced to permit the escape of treament fluid through the spaces between the discharge louvres.

The end wall 148 of the cap 146 has formed therein a centrally located opening 149 into which there has been fitted an outer ring 151. Circumferentially spaced holes are centered on the abutting edge portions of the ring 151 and end wall 148 for receiving bolts 152 to rigidly connect the ring to the end wall. An inner ring 153 has been fitted with its peripheral edge arranged in abutting relationship with the inner edge of ring 151 and is secured to the ring 151 by bolts 154 which are positioned in circumferentially spaced holes that are centered on the abutting edges of the rings 153 and 151. The size of the opening in the end wall 148 may be varied, therefore, by selectively employing one or both of the rings 151 and 153.

As is best illustrated in Fig. 5*b*, the seal assembly 43 between the flange 139 and the opening through which the discharge nozzle 39 projects into the discharge hood 41 includes a plate ring 155 which is mounted on and projects radially outwardly from the flange 139. Mounted on and extending circumferentially around the ring 155 is a T-ring 157 which is provided with slots 158 for receiving the bolts 159 by means of which the T-ring is connected to the plate ring for radial adjustment thereon to center the T-ring relative to the axis of the shell 25.

Mounted on the discharge hood 41 is an angle ring 161 the axially extending flange of which is aligned with the peripheral flange of the T-ring 157. A seal strip 162 of asbestos belting, or silimar material, is wrapped circumferentially around the aligned flanges of the angle ring 161 and T-ring 157. This strip is held in place by two wire ropes 163 which are wrapped around the strip radially outwardly of the aligned flanges with their opposite end portions crossed and anchored to the discharge hood 41 by the brackets 164. The ends of the cables 163 are connected to the brackets 164 by threaded members 165 so that the tension in the cables may be adjusted to provide proper sliding engagement between the T-ring 157 and the seal strip 162 and to securely anchor the seal strip to the angle ring 161.

Referring now to Figs. 2, 5*a* and 5*b* for a detail description of the odperation of the device illustrated therein, material is introduced into the rotating shell 25 through the opening 54 in the feed end plate 53 in any suitable manner. This material entering the shell 25 falls onto the tangential louvers 57 and, due to the inclination of the louvres 57 relative to the axis of the shell, will form a bed which extends axially of the shell and is supported by the tangential louvres at the bottom and to the side toward which the shell is rotated. The extent to which the material in the bed is carried up the side of the shell 25 by rotation thereof will depend primarily upon the angle of the repose of the material. The depth of the bed of material may be adjusted, as will be later described, so that a greater or lesser number of tangential louvres 57 are covered by the bed. In any event, the distributing ring assembly 35 may be mounted on its side supports 37 and bottom support 38 to center the air inlet opening 70 in alignment with the treatment gas passage 47 that lies radially outwardly of the center of the bed. The damper plates 79 may thereafter be adjusted to increase or decrease the circumferential dimension of the opening in accordance with the width of the bed.

The treatment gas which is admitted to the inlet connector 36, therefore, will flow into only those longitudinally extending passages 47 which are positioned radially outwardly of the bed of material. The passages 47 positioned radially outwardly of the thinner side edge portions of the bed will receive only a limited supply of treatment gas due to the oblique arrangement of the end edges of the damper plates 79. The treatment air flowing through the spaces between the circumferentially overlapped edge portions of the tangential louvres 57 will enter the material and will flow therethrough into the central portion of the shell.

By reference to Figs. 8 and 9, it will be readily apparent that the pockets formed between the axially extending portions 63 and 64 of adjacent tangential louvres 57 will receive and positively displace circumferentially around the shell 25 a portion of the material adjacent the tangential louvres so that the material in the bed will have imparted thereto a continuous rolling motion and will not be permitted to merely slide around the tangential louvres 57 with the material particles in a relatively unchanged position. Further, the rearwardly and radially outwardly directed spaces between the overlapped edge portions 58 and 64 of adjacent tangential louvres 57 will prevent any material from spilling into the passages 47 even though the material has a relatively low angle of repose.

Some of the material in that portion of the bed adjacent the end plate 55, at the discharge end of the shell 25, will continuously spill through the opening 56 onto the discharge louvres 141. Since these discharge louvres are so formed that the material resting thereon cannot spill therebetween, the depth of the bed of material on the louvres will be dependent upon the size of the opening at the cap 146 and this opening may be varied in size by means of the inner ring 153 and outer ring 151. Since the operating depth of the bed of material maintained in the shell 25 will be controlled by the depth of the material maintained in the discharge nozzle 39, the rings 151 and 153 also will function to control the bed depth in the shell.

The treatment gas within the centrally located portion of the shell 25 is released from the latter through the opening 56 and will immediately escape through the spaces between the adjacent discharge louvres 141 in the upper portion of the discharge nozzle 39 and will be withdrawn from the discharge hood through the opening in the top of the latter. The material resting on the discharge louvres 141, therefore, is not subjected to further action by the treatment gas after the material is discharged into the hood and the addition or removal of the rings 151 and 153 will have very little effect upon the flow of treatment gas from the shell 25 into the discharge hood 41.

Material in the discharge nozzle 39 adjacent the cap 146 will spill through the opening in the latter and will drop into the bottom portion of the discharge hood for release past the dampers 45 in the discharge chute 44. Since the counterweighted dampers 45 will retain a certain quantity of material in the bottom portion of the discharge hood 41 there will be no escape or treatment fluid through the discharge chute 44.

It will be noted that adjustment of the size of the opening in the cap 146 of the discharge nozzle 139 may be easily and quickly accomplished by opening the access door 42 of the discharge hood 41 which is opposite and adjacent to the rings 151 and 153.

It is to be understood that the form of this invention herewith shown and described is to be taken as a preferred example of the same and that various changes in the shape, size, and arrangement of parts may be resorted to without departing from the spirit of the invention or the scope of the subjoined claims.

Having thus described the invention, I claim:

1. A device of the type described, comprising means supported for rotation about a horizontal axis and forming an annular series of axially extending treatment gas passages, a plurality of axially extending, circumferentially overlapped louvres arranged tangentially around the radially inner sides of said passages, the overlapped portions of said louvres being spaced to provide an outlet for each of said passages that is directed rearwardly and radially outwardly relative to the direction of rotation of said passage forming means, means for introducing material into one end of said passage forming means to form a bed of material on the louvres at the bottom and to one side thereof, means for introducing treatment gas into the passages positioned radially outwardly of the material bed, said passage forming means having a centrally located opening in the end thereof opposite the point of introduction of the material for releasing the treatment gas and for discharging material from said bed, a plurality of discharge louvres, means mounting said discharge louvres to extend axially outwardly from the discharges end of said passage forming means in surrounding relationship with the discharge opening, said discharge louvres having their adjacent longitudinal edge portions circumferentially overlapped and spaced to provide tortuous passageways therebetween for the escape of the released treatment gas, the discharged material being supported on the discharge louvres for movement to the outer ends thereof, and means mounted on the outer ends of said discharge louvres and providing a centrally located opening from the space within the louvres for releasing the material therefrom.

2. A device as defined in claim 1 further characterized by said means for mounting the discharge louvres comprising a louvre mounting flange extending axially outwardly from the discharge end of said passage forming means in surrounding relationship with and radially outwardly of said discharge opening, said discharge louvres being mounted on said flange with their longitudinally inner ends in abutting relationship with the discharge end of the passage forming means between said flange and said discharge opening and with their outer end portions projecting axially outwardly beyond said flange, and said means for releasing the material from the outer ends of said discharge louvres comprising a cap positioned across the ends of said discharge louvres, said cap having a centrally located opening, and means for varying the diameter of said cap opening to control the depth of the material supported on the discharge louvres and the depth of the material bed.

3. A device as defined in claim 2 further characterized by said discharge louvres each having a longitudinally extending base portion connected to the mounting flange and to the cap, a longitudinally extending intermediate portion adjacent said base portion and projecting radially inwardly and rearwardly therefrom relative to the direction of rotation of said passage forming means, and a longitudinally extending edge portion adjacent said intermediate portion and projecting rearwardly therefrom to a position radially inwardly of the base portion of the rearwardly adjacent louvre.

4. A device as defined in claim 2 further characterized by said means for varying the diameter of the cap opening comprising a plurality of concentrically arranged annular members detachably secured to the cap and to each other, the attachment and detachment of said members varying the diameter of the cap opening, a discharge hood encasing said discharge louvres and said cap and having an access opening adjacent said cap, and a closure for said access opening that is movable to permit attachment and detachment of the annular members of the adjacent cap.

5. A device of the type defined, comprising a horizontally arranged cylindrical shell supported for rotation about its axis, a circumferentially spaced series of axially extending radial louvres having their outer edges secured to said shell to provide radially inwardly opening treatment gas passages therebetween, an axially extending tangential louvre mounted on the inner edge portion of each radial louvre, said tangential louvres having their adjacent edge portions circumferentially overlapped and supported in spaced relationship to provide an outlet for each treatment gas passage, said outlets facing rearwardly and outwardly relative to the direction of rotation of the shell, means for introducing material into one end of said shell to form a bed supported on the tangential louvres at the bottom and to one side of the rotating shell, means for introducing treatment gas into said passages positioned radially outwardly of the material bed for flow through the outlets from the passages and the material in the bed, said shell having a centrally located opening in the end thereof opposite the point of introduction of the material for releasing the treatment gas and for discharging material from said bed, a plurality of discharge louvres, means mounting said discharge louvres to extend axially outwardly from the discharge end of said shell in surrounding relationship with the discharge opening, said discharge louvres being circumferentially overlapped and spaced to provide tortuous passageways therebetween for the escape of the released treatment gas, the discharged material being supported on the discharge louvres for movement to the outer ends thereof, and means mounted on the outer ends of said discharge louvres and providing a centrally located opening from the space within the louvres for releasing the material therefrom.

6. A device as defined in claim 5 further characterized by each of said tangential louvres having its leading edge portion in the direction of rotation of said shell secured to the inner edge portion of its associated radial louvre and the opposite edge portion supported in inwardly spaced parallel relationship with the leading edge portion of the next adjacent tangential louvre to provide said rearwardly and radially outwardly directed outlet for each treatment gas passage, and each of said discharge louvres having its leading edge portion inclined forwardly and radially inwardly relative to the direction of rotation of said shell and having its opposite edge portion in inwardly spaced parallel relationship with the leading edge portion of the next adjacent discharge louvre, the leading edge portions of said discharge louvres retaining the material which spills into the tortuous passageways between the louvres and returning the material to a supported position on the louvres as the shell is rotated.

7. A device of the type described, comprising means supported for rotation about a horizontal axis and forming an annular series of axially extending, radially inwardly opening treatment gas passages, adjacent ones of said passages having partitions therebetween, an axially extending tangential louvre mounted on each of said partitions and extending rearwardly therefrom relative to the direction of rotation of said passage forming means into inwardly spaced, overlapped relationship with the edge portion of the next adjacent louvre, the overlapped louvre portions forming a rearwardly and radially outwardly directed outlet therebetween for each treatment gas passage, means for introducing material onto said louvres to form a bed at the bottom and to one side of said passage forming means, means for introducing treatment gas into the passages positioned radially outwardly of the material bed, and means for discharging material from said bed.

8. A device of the type described, comprising a horizontally arranged cylindrical shell supported for rotation about its axis, a circumferentially spaced series of axially extending radial louvres having their outer edges secured to said shell to provide inwardly opening treatment gas passages therebetween, an axially extending tangential louvre mounted on the inner edge portion of each radial louvre, said tangential louvres having their adjacent edges portions circumferentially overlapped and supported in spaced relationship to provide an outlet therebetween for each treatment gas passage, said outlets being directed rearwardly and radially outwardly relative to the direction of rotation of the shell, means for introducing material into one end of said shell, said material forming a bed supported on the tangential louvres at the bottom and to one side of the rotating shell, means for introducing treatment gas into the ends of the passages positioned radially outwardly of the material bed and for closing the corresponding ends of the remaining passages, and means for discharging material from the end of said shell opposite the point of introduction of the material.

9. A device as defined in claim 8 further characterized by the overlapped edge portions of said tangential louvres being arranged in parallel relationship, the inwardly spaced edge portion of each pair of overlapped edge portions and an intermediate portion of the next adjacent tangential louvre being angularly related to provide a radially inwardly opening pocket therebetween for receiving and positively displacing a portion of the material in said bed when the pocket is moved in underlying relationship with the bed.

10. A device of the type described, comprising a horizontally arranged cylindrical shell supported for rotation about its axis, a circumferentially spaced series of axially extending radial louvres having their outer edges secured to said shell and their inner marginal portions bent rearwardly and outwardly relative to the direction of rotation of the shell, the spaces between said radial louvres forming radially inwardly opening treatment gas passages, a plurality of axially extending tangential louvres each having its leading side edge portion in the direction of rotation of said shell secured to the inner marginal portion of an associated radial louvre and the opposite edge portion supported in inwardly spaced parallel relationship with the leading edge portion of the next adjacent tangential louvre to provide a rearwardly and outwardly directed outlet for each of said treatment gas passages, means for introducing material into one end of said shell, said material forming a bed supported on the tangential louvres at the bottom and to one side of the rotating shell, means for introducing treatment gas into the ends of the passages positioned radially outwardly of the material bed and for closing the corresponding ends of the remaining passages, and means for discharging material from the end of said shell opposite the point of introduction of the material.

11. A device as defined in claim 10 further characterized by said radial louvres being longitudinally tapered to cause their inner marginal portions to diverge from the axis of the shell, said tangential louvres each having a longitudinally tapered intermediate portion between its leading and opposite side edge portions to position the overlapped edge portions of adjacent tangential louvres in uniformly spaced relationship along the lengths of the tapered radial louvres.

12. A device as defined in claim 11 further characterized by said tapered intermediate portion of each tangential louvre being formed adjacent the leading side edge portion to extend rearwardly therefrom relative to the direction of rotation of said shell, each of said tangential louvres having a second intermediate portion extending rearwardly and radially inwardly from the tapered intermediate portion to said opposite side edge portion, and the opposite side edge portion of each tangential louvre and second intermediate portion of the adjacent tangential louvre forming a radially inwardly opening pocket therebetween for receiving and positively displacing a portion of the material in said bed when the pocket is moved in underlying relationship with the bed.

13. A device of the type described, comprising a rotatably supported, horizontally arranged cylindrical shell through which a bed of material is continuously advanced while subjected to the action of a treatment gas, said shell having a centrally located opening in one end thereof through which the treatment gas is released and the material from the bed is discharged, a plurality of discharge louvres, means mounting said discharge louvres on said one end of the shell to extend axially outwardly therefrom in surrounding relationship with the discharge opening, said discharge louvres being circumferentially overlapped and spaced to provide tortuous passageways therebetween for the escape of the released treatment gas, the discharged material being supported on the discharge louvres for movement to the outer ends thereof, a cap mounted on the outer ends of said discharge louvres and providing an opening from the space within the louvres for releasing the material therefrom, and means for varying the diameter of the opening in said cap to regulate the depth of material in said bed, the escape of the treatment gas through said tortuous passageways being substantially constant at the varying diameters of the cap opening.

14. A device as defined in claim 13 further characterized by said means for mounting said discharge louvres comprising a louvre mounting flange extending axially outwardly from the discharge end of the shell in surrounding relationship with and radially outwardly of said discharge opening, and said discharge louvres each having a longitudinally extending base portion connected to the mounting flange and extending axially outwardly therefrom for connection with said cap, a lip projecting forwardly and radially inwardly from said base portion relative to the direction of rotation of said shell, an intermediate portion projecting rearwardly and radially inwardly from said base portion, and an edge portion projecting rearwardly from said intermediate portion to a position radially inwardly of the lip and base portion of the rearwardly adjacent louvre.

15. A device as defined in claim 13 further characterized by a discharge hood encasing said discharge louvres and said cap and having an access opening adjacent the cap, and a removable closure for said access opening, removal of said closure affording access to said cap for varying the diameter of the opening provided by the cap.

References Cited in the file of this patent

UNITED STATES PATENTS

| | | |
|---|---|---|
| 2,522,025 | Erisman | Sept. 12, 1950 |
| 2,581,756 | Erisman | Jan. 8, 1952 |